US009251721B2

(12) United States Patent
Lampotang et al.

(10) Patent No.: US 9,251,721 B2
(45) Date of Patent: Feb. 2, 2016

(54) INTERACTIVE MIXED REALITY SYSTEM AND USES THEREOF

(75) Inventors: Samsun Lampotang, Gainesville, FL (US); Nikolaus Gravenstein, Gainesville, FL (US); David Erik Lizdas, Gainesville, FL (US); Isaac Thomas Luria, Gainesville, FL (US); Matthew James Peterson, Lutz, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 177 days.

(21) Appl. No.: 13/514,474

(22) PCT Filed: Apr. 8, 2011

(86) PCT No.: PCT/US2011/031738
§ 371 (c)(1),
(2), (4) Date: Jun. 7, 2012

(87) PCT Pub. No.: WO2011/127379
PCT Pub. Date: Oct. 13, 2011

(65) Prior Publication Data
US 2012/0280988 A1    Nov. 8, 2012

Related U.S. Application Data

(60) Provisional application No. 61/322,569, filed on Apr. 9, 2010.

(51) Int. Cl.
G06T 19/00    (2011.01)
G09B 23/28    (2006.01)

(52) U.S. Cl.
CPC ............ *G09B 23/286* (2013.01); *G06T 19/006* (2013.01); *G09B 23/285* (2013.01)

(58) Field of Classification Search
None
See application file for complete search history.

(56) References Cited

U.S. PATENT DOCUMENTS 4,613,328 A * 9/1986 Boyd .............................. 604/156
6,714,901 B1 * 3/2004 Cotin et al. ........................ 703/7
(Continued)

FOREIGN PATENT DOCUMENTS

JP    2003210386    7/2003
KR    1020030044909 A    6/2003
(Continued)

OTHER PUBLICATIONS

Bichlmeier, Christoph, et al. "Improving Depth Perception in Medical AR." Bildverarbeitung für die Medizin 2007. Springer Berlin Heidelberg, 2007. 217-221.*
(Continued)

*Primary Examiner* — Daniel Hajnik
(74) *Attorney, Agent, or Firm* — Saliwanchik, Lloyd & Eisenschenk

(57) ABSTRACT

An interactive mixed reality simulator is provided that includes a virtual 3D model of internal or hidden features of an object; a physical model or object being interacted with; and a tracked instrument used to interact with the physical object. The tracked instrument can be used to simulate or visualize interactions with internal features of the physical object represented by the physical model. In certain embodiments, one or more of the internal features can be present in the physical model. In another embodiment, some internal features do not have a physical presence within the physical model.

25 Claims, 9 Drawing Sheets

(56) References Cited

U.S. PATENT DOCUMENTS

| | | | |
|---|---|---|---|
| 6,842,175 B1* | 1/2005 | Schmalstieg et al. | 345/427 |
| 6,863,536 B1 | 3/2005 | Fisher et al. | |
| 7,130,447 B2 | 10/2006 | Aughey et al. | |
| 7,747,311 B2 | 6/2010 | Quaid, III | |
| 2002/0168618 A1* | 11/2002 | Anderson et al. | 434/262 |
| 2004/0097805 A1* | 5/2004 | Verard et al. | 600/428 |
| 2004/0175684 A1 | 9/2004 | Kaasa et al. | |
| 2007/0236514 A1* | 10/2007 | Agusanto et al. | 345/646 |
| 2008/0187896 A1 | 8/2008 | Savitsky | |
| 2010/0159434 A1 | 6/2010 | Lampotang et al. | |
| 2010/0225340 A1* | 9/2010 | Smith et al. | 324/713 |
| 2011/0046483 A1* | 2/2011 | Fuchs et al. | 600/439 |
| 2012/0038639 A1* | 2/2012 | Mora et al. | 345/420 |

FOREIGN PATENT DOCUMENTS

| | | |
|---|---|---|
| KR | 100748269 B1 | 8/2007 |
| WO | 9938141 | 7/1999 |
| WO | 02059859 A1 | 8/2002 |
| WO | 03096307 A1 | 11/2003 |

OTHER PUBLICATIONS

Bichlmeier, Christoph, et al. "Contextual anatomic mimesis hybrid in-situ visualization method for improving multi-sensory depth perception in medical augmented reality." Mixed and Augmented Reality, 2007. ISMAR 2007. 6th IEEE and ACM International Symposium on. IEEE, 2007.*

Fuhrmann, Anton, and Dieter Schmalstieg. "Concept and implementation of a collaborative workspace for augmented reality." Graphics'99 18.3 (1999).*

Hinckley, Ken, et al. "Two-handed virtual manipulation." ACM Transactions on Computer-Human Interaction (TOCHI) 5.3 (1998): 260-302.*

Zhu, Yanong, et al. "A virtual ultrasound imaging system for the simulation of ultrasound-guided needle insertion procedures." Proc. Medical Image Understanding and Analysis (MIUA) 1 (2006): 61-65.*

Quarles, J., et al., "A Mixed Reality Approach for Merging Abstract and Concrete Knowledge," Proceedings of IEEE Virtual Reality; Feb. 2008, pp. 27-34.

Quarles, J., et al., "Tangible User Interfaces Compensate for Low Spatial Cognition," Proceedings of the IEEE Symposium on 3D User Interfaces; 2008, pp. 11-18.

Quarles, J., et al., "Collocated AAR: Augmenting After Action Review with Mixed Reality," 7th IEEE/ACM ISMAR, Cambridge, UK; Sep. 2008.

* cited by examiner

INTERACTIVE MIXED REALITY SYSTEM AND USES THEREOF

CROSS-REFERENCE TO RELATED APPLICATIONS

This application is the U.S. national stage application of International Application Ser. No. PCT/US2011/031738, filed Apr. 8, 2011, which claims the benefit of U.S. Provisional Application Ser. No. 61/322,569 filed Apr. 9, 2010, which are hereby incorporated by reference in their entirety, including all figures, tables and drawings.

BACKGROUND

In general, a simulation provides representations of certain key characteristics or behaviors of a selected physical or abstract system. Simulations can be used to show the effects of particular courses of action. A physical simulation is a simulation in which physical objects are substituted for a real thing or entity. Physical simulations are often used in interactive simulations involving a human operator for educational and/or training purposes. For example, mannequin patient simulators are used in the healthcare field, flight simulators and driving simulators are used in various industries, and tank simulators may be used in military training.

Physical simulations or objects provide a real tactile and haptic feedback for a human operator and a 3-dimensional (3D) interaction perspective suited for learning psycho-motor and spatial skills.

In the health care industry, as an example, medical simulators are being developed to teach therapeutic and diagnostic procedures, medical concepts, and decision making skills. Many medical simulators involve a computer or processor connected to a physical representation of a patient, also referred to as a mannequin patient simulator (MPS). These MPSs have been widely adopted and consist of an instrumented mannequin that can sense certain interventions and, via mathematical models of physiology and pharmacology, the mannequin reacts appropriately in real time. For example, upon sensing an intervention such as administration of a drug, the mannequin can react by producing an increased palpable pulse at the radial and carotid arteries and displaying an increased heart rate on a physiological monitor. In certain cases, real medical instruments and devices can be used with the life-size MPSs and proper technique and mechanics can be learned.

Physical simulations or objects are limited by the viewpoint of the user. In particular, physical objects such as anesthesia machines (in a medical simulation) and car engines (in a vehicle simulation) and physical simulators such as MPSs (in a medical simulation) remain a black-box to learners in the sense that the internal structure, functions and processes that connect the input (cause) to the output (effect) are not made explicit. Unlike a user's point of reference in an aircraft simulator where the user is inside looking out, the user's point of reference in, for example, a mannequin patient simulator is from the outside looking in any direction at any object, but not from within the object.

In addition, many visual cues such as a patient's skin turning cyanotic (blue) from lack of oxygen are difficult to simulate. These effects are often represented by creative substitutes such as blue make-up and oatmeal vomit. However, in addition to making a mess, physically simulated blood gushing from a simulated wound or vomit can potentially cause short-circuits because of the electronics in a MPS.

Furthermore, it can be difficult to create a physical simulator having internal features that can be repeatedly interacted with. For example, physical simulators or mannequins for insertion of needles or lines into veins and/or arteries often involve plastic tubing carrying colored liquids. These plastic tubes have a limited life span due to puncturing and leaks. Often, disposable components and replacement parts are used in order to carry out multiple sessions on a single physical simulator or mannequin. In addition, mass production of physical disposables is less amenable to implementation of anatomical variability than a virtual model. Moreover, these disposable components and replacement parts can be expensive, thereby limiting the number of times a person can use the simulator in a cost-effective manner. In addition, the short lifetime of these disposable components and replacement parts leads to increased volume disposed in a landfill.

Virtual simulations have also been used for education and training. Typically, the simulation model is instantiated via a display such as a computer, PDA or cell phone screen; or a stereoscopic, 3D, holographic or panoramic display. An intermediary device, often a mouse, joystick, or Wii™, is needed to interact with the simulation.

Virtual abstract simulations, such as transparent reality simulations of anesthesia machines and medical equipment or drug dissemination during spinal anesthesia, emphasize internal structure, functions and processes of a simulated system. Gases, fluids and substances that are usually invisible or hidden can be made visible or even color-coded and their flow and propagation can be visualized within the system. However, in a virtual simulation without the use of haptic gloves, the simulator cannot be directly touched like a physical simulation. In the virtual simulations, direct interaction using one's hands or real instruments such as laryngoscopes or a wrench is also difficult to simulate. For example, it can be difficult to simulate a direct interaction such as turning an oxygen flowmeter knob or opening a spare oxygen cylinder in the back of the anesthesia machine.

In addition, important tactile and haptic cues, such as the deliberately fluted texture of an oxygen flowmeter knob in an anesthesia machine or the pressure in a needle/syringe felt when moving through fat and muscle or impinging on bone structures, are missing. Furthermore, the emphasis on internal processes and structure may cause the layout of the resulting virtual simulation to be abstracted and simplified and thus different from the actual physical layout of the real system. This abstract representation, while suited for assisting learning by simplification and visualization, may present challenges when transferring what was learned to the actual physical system.

Accordingly, there continues to be a need for a simulation system capable of in-context integration of virtual representations with a physical simulation or object.

BRIEF SUMMARY

The present invention provides an interactive combined physical and virtual (i.e., mixed) system. According to embodiments of the present invention, part or all of a 3D virtual model is registered invisibly and/or internally to a physical model. This invisible and/or internally registered 3D virtual model may not be visible to a user or operator of the subject interactive system when performing a simulation. The user or operator can interact with the physical model via at least one of different methods, such as palpation, tactile feedback, and a physical tool or implement that may be tracked in a 3D space. Embodiments of the invention can be used to simulate "blind" procedures where an operator is interacting with an object without direct line of sight for what he or she is doing.

In accordance with certain embodiments of the invention, only part or all of the surface or external visible area of the physical model needs to be implemented for purposes of the simulation, while part or all of the internal structure, processes, and functions inside the model may be implemented virtually. For such embodiments, the time and effort to manufacture and precisely locate part or all of the physical representations of the internal structure, processes, and functions in 3D-space is eliminated, as well as any expense and environmental impact associated with physical disposables.

The present invention provides, as an example, mixed simulator systems capable of providing training for blind procedures where direct line of sight is not available. The mixed simulator system of an embodiment of the invention combines a physical object and/or simulator with a virtual representation and/or simulator. Accordingly, it is possible to simultaneously interact with a physical object and a virtual simulation of internal elements of the physical object.

In one embodiment for a medical implementation, the subject interactive mixed simulator system incorporates a patient mannequin, a tool and/or instrument to interact with the patient mannequin, and a virtual model of internal anatomy that can be associated with the patient mannequin and instantiated on a display. The patient mannequin can be a partial mannequin or a full body representing a patient, and can include physical body characteristics, such as anatomical landmarks of a patient. The tool and/or instrument to interact with the patient mannequin can be, for example, an actual or fake medical instrument, a haptic device used in a physical simulation, or a combination thereof. The virtual model can be instantiated on a screen or monitor of a display device and/or registered to its physical counterpart that may be produced from a 3D printer or fast prototyping machine. The display device can be mobile, such as a computer tablet, or stationary, such as a computer or television screen.

According to one medical implementation, a mixed simulator is provided that can be used to train for insertion of a central venous line (CVL). A trainer for central venous access can include a 3D virtual model created using a medical scan of a patient. A library of patient anatomies is provided to reflect anatomical variability for different ages, genders, ethnicities and body types. A physical mannequin and a physical syringe are also provided for CVL training. For the physical mannequin, a rapid prototyping machine, such as a 3D printer, can be used to create a 3D physical bone structure that, when draped with fake skin, enables visual and tactile (palpation) location of landmarks such as the clavicle and sternal notch. Different thicknesses of sponge layers can be placed below the skin to simulate varying amounts of subcutaneous body fat. The fake skin can be selected to provide the correct tactile feedback upon puncture with a real needle and is placed over the replicated bone structure to create the physical mannequin. In one embodiment, certain parts of the body's external surface (e.g., the skin) can be printed (e.g., by 3-D printing) to provide landmarks while other parts of the body's surface may be covered with simulated skin.

The syringe and physical mannequin are both tracked using an augmented reality tool kit and have model counterparts in a virtual environment. Important "wet" anatomic components, such as lungs, arteries, and veins, can be included in the virtual environment. The user's CVL placement technique is mirrored in the virtual environment where the user's techniques can be analyzed, recorded, and scored. During the simulation, when the tip of the physical needle contacts the physical 3D bone structure, haptic feedback is provided to the operator. This haptic feedback can be provided solely from interaction with the physical 3D bone structure or additional haptic feedback can be provided. In addition, when the operator lets the needle tip stray into the virtual 3D lungs, an iatrogenic pneumothorax can be simulated, a capability that is non-existent in current CVL trainers.

Specifically exemplified herein is an interactive mixed reality system for healthcare training and procedures. It will be clear, however, from the descriptions set forth herein that the mixed reality system of the subject invention finds application in a wide variety of healthcare, education, military, and industry settings including, but not limited to, simulation centers, educational institutions, vocational and trade schools, museums, and scientific meetings and trade shows.

DETAILED DISCLOSURE

Figure 1:
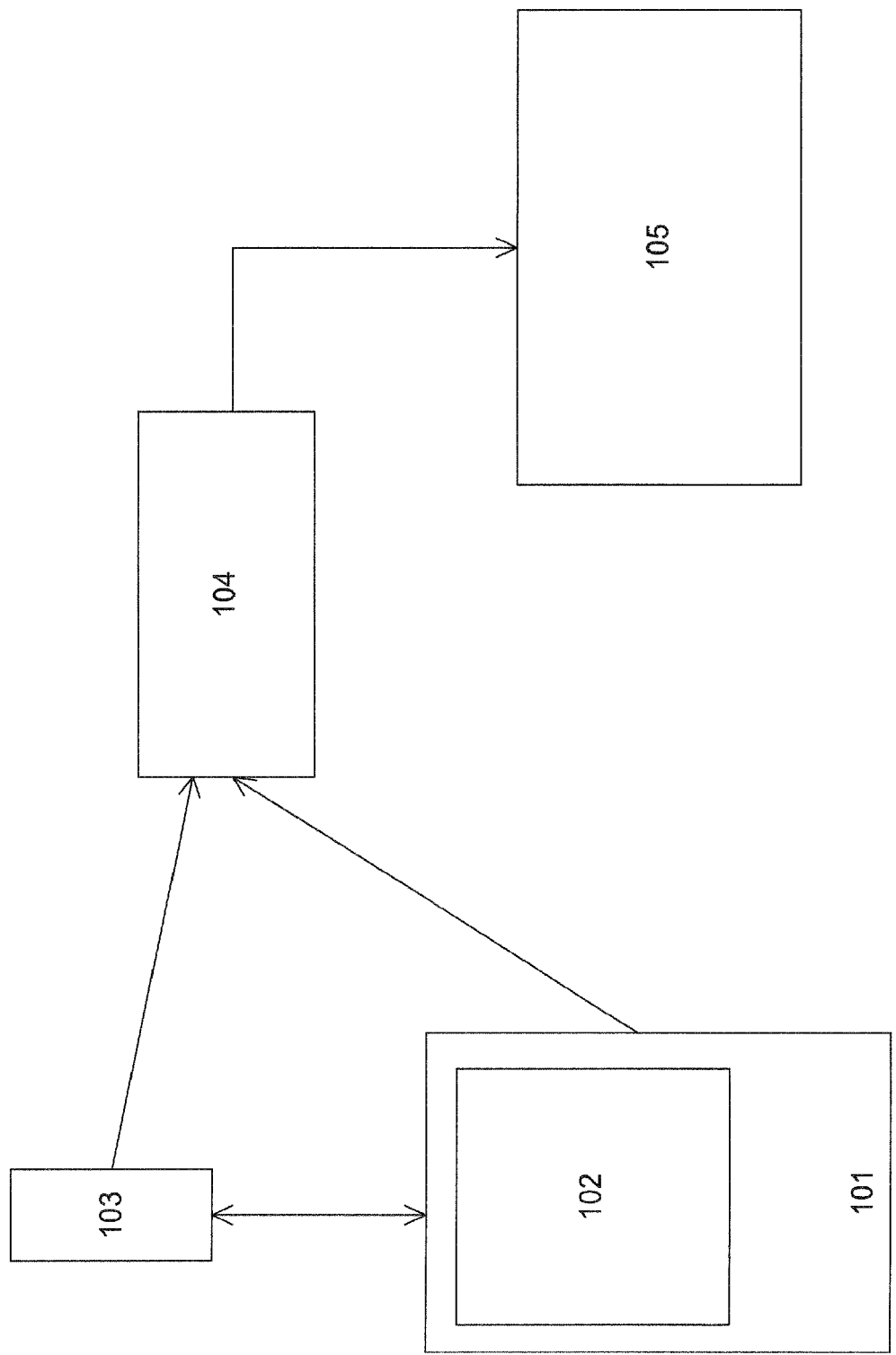
FIG. 1 shows a block diagram of an interactive mixed simulator system according to an embodiment of the invention.

Embodiments of the present invention provide an interactive mixed reality system combining a physical object and/or simulator with a virtual representation and/or simulator.

According to one embodiment of the present invention, a mixed reality system is provided that includes a physical model of an object or system, a virtual model of the object or system, and an instrument used to interact with the physical model of the object or system.

In accordance with certain embodiments of the invention, the external surface of the object or system is implemented as a physical form for purposes of the simulation, while part or all of the internal structure, processes, and functions inside the model may be implemented virtually.

In certain embodiments, one or more of the internal features can be present in the physical model. In another embodiment, the internal features do not have a physical presence within the physical model. Instead, certain internal features only have a presence in the virtual model.

For embodiments implementing part of the internal structures, processes, and functions via a virtual model, certain of the internal structures can be provided in physical form in the physical model. An example of the internal structures being implemented partially by a physical model and partially by a virtual model, in a medical simulation where the object or system is a patient and the simulation is of a CVL procedure, a physical model of ribs can be provided inside a cavity of a patient mannequin and the blood vessels and lungs can be implemented virtually. The physical ribs or other bone structure can provide inexpensive haptic feedback when a needle tip of a physical needle/syringe assembly manipulated by a trainee impinges the physical ribs/bone structure when simulating the insertion of the needle tip into a blood vessel. Collapse, breathing, or other aspects associated with the lungs of a patient can be simulated via the virtual model.

In certain embodiments, the particular physical structure representing an internal feature/structure of the object or system provided in the physical form can have an additional virtual representation associated with it. For example, an internal structure can be provided in physical form inside the physical model and a process or function associated with that internal structure can be implemented in the virtual model.

The physical model can contain portions of internal structures in order to allow a user to feel or see those internal structures while still providing regions for interaction that are implemented by the virtual model. For example, in a medical simulation, certain two-sided anatomy (i.e., anatomy located in two sides of a patient such as right side and left side of a patient when performing a central line insertion) can have one side physically implemented to provide a concrete 3D model that trainees can observe and touch directly and the other side implemented virtually and covered. As a specific example, blood vessels on one side of a patient's body can be physically implemented while on the other side, the blood vessels are virtual. The physically implemented blood vessels can be created via a 3D printer and color-coded (for example blue for veins and red for arteries). The physical model can have those physically implemented structures exposed while the virtual structures are covered by the external surface structure of the object or system.

In addition to the physical model of an object or system and a virtual model of the object or system, a physical instrument is provided to interact with the physical model of the object or system. The physical instrument of the mixed reality system can be a real or fake instrument that is intended to interact with internal features of a physical object represented by the physical model. The instrument may be a real instrument that is broken or intentionally modified. Tracking of the instrument used to interact within the physical model allows a mirroring of the user's actions in the virtual model, and a resulting interaction with the virtual model.

The virtual model includes abstract representations and/or concrete representations. The abstract representation is a simplified or extended representation of an object and can include features on a cut-out, cross-sectional, simplified, schematic, iconic, exaggerated, surface, sub-system, organ, functional blocks, structural blocks or groups, cellular, molecular, atomic, and sub-atomic level. Abstract representations include, but are not limited to, inner workings of a selected object or region and can include multiple levels of detail such as surface, sub-system, organ, functional blocks, structural blocks or groups, cellular, molecular, atomic, and sub-atomic representations of the object or region. The abstract representation can also include images typically achieved through medical or other imaging techniques, such as MRI scans, CAT scans, echography scans, ultrasound scans, and X-ray. Concrete representations are true or nearly accurate representations of an object. The concrete representations can reflect typical clues and physical manifestations of an object, such as, for example, a representation of the sternal notch, ribs or bone structure or a vein or artery in a patient.

The virtual model can be instantiated on a screen or monitor of a display device. The display device can be mobile, such as a computer tablet, or stationary, such as a computer or television screen.

The virtual model can be displayed within view of the user or at a location in view of a person monitoring the simulation. In a further embodiment, the virtual model can be made available for after action review of the actions taken by the user. The after action review may be at a site remote from the simulator/trainer or may be performed collocated with the simulator/trainer so that the user can attempt to redo certain actions during the after action review.

The subject mixed reality system combines advantages of both physical simulations and virtual representations such that a user has the benefit of real tactile and haptic feedback with a 3D perspective, and the flexibility of virtual images for concrete and abstract representations. In addition, the physical object or simulation can omit certain internal features which are to be interacted with. Instead, these internal features are provided solely in the virtual representation. Furthermore, the virtual model provides a means to do the "messy stuff" virtually with a minimum of spills and cleanup.

Embodiments of the subject mixed reality system can be applied to simulations benefiting from realistic 3D modeling of hidden or internal elements of an object in conjunction with physical interaction with the object's physical model. According to certain embodiments, the subject system is applied to training for blind procedures where an operator is interacting with an object without direct line of sight. In certain procedures, the line of sight is relegated to indirect methods such as using images from cameras or other imaging devices, or mirrors placed to reflect features in locations not in the person's direct sight. In other procedures, no visual of the internal features of the object is provided. Embodiments of the subject system can be applied to training for both procedures having an indirect line of sight available and procedures where no line of sight is available.

In blind procedures, a person performing an action associated with the procedure cannot directly see the particular items being manipulated or interacted with; however, the structures of these internal or hidden items are known even if their precise locations and sizes vary in actual objects. This person usually goes by "feel" to determine whether his or her action is being performed at the correct location to achieve a particular result. The person performing the procedure must determine where the hidden/internal items are located and accomplish the desired task without the aid of being able to actually see the hidden/internal item. Certain embodiments of the present invention provide a system that simulates the blind procedure while also providing a visual reference for the hidden or internal elements. According to one embodiment, a first mode is provided where a user can train under completely blind scenarios and review the internal steps and interactions later. In addition, a second mode is provided where the user can train while having the internal or hidden elements available for viewing while performing the blind procedure. A third mode is further provided where the user can compare his or her motions to those of an expert performing the same procedure. This comparison mode can be used during training and viewable on a display within the line of sight of the user when the user is performing the simulation. Alternatively, the comparison can be performed during an after action review as described with respect to the first mode.

For a person performing a blind procedure, it can be important to know the layout of the hidden/internal items and the possible tactile feedback that the hidden/internal items can provide as the person navigates to and/or determines the location of a particular hidden/internal item. According to an embodiment, a physical model representing the object having the hidden/internal items includes physical characteristics affected by the position or location of the hidden/internal items. Hidden/internal items that can be felt (e.g., palpated) when touching the real object can be included in the physical model to help train a person to utilize the "roadmaps" available during an actual procedure. For example, the physical representation can include features providing additional feedback to a user interacting with the physical representation. As one example where the physical object represents a patient, bone structure can be included hidden inside the physical representation such that a user can learn the feel of a case where a real needle being inserted into a patient hits the patient's bone structure, such as a physical 3D bone structure in the physical object that can provide haptic feedback. According to a specific embodiment, a physical representation of a clavicle can be included in a physical model for a patient in order to help a user feel for the location where a vein may be positioned near. A user can then use his or her fingers to feel, palpatively and/or haptically, the "clavicle" through the "skin" to establish a road map of where the needle is to be inserted to reach the desired vein.

In accordance with an embodiment, internal or hidden features of an object are represented in a virtual model of the object. Variations in characteristics of these features can be represented during simulations to provide a user with training for deviations in actual objects. The mixed reality system can provide the viewing of multiple virtual versions of internal features associated with the physical object. The multiple virtual versions that are mapped (or registered) to the physical object allow for training and education of many complex concepts not afforded with existing methods. Multiple training sessions can be accomplished using random variations or a programmed pattern to the variations to improve a user's ability to handle the variations that may exist in reality.

The physical model, virtual model, and instrument are linked together by a registration between virtual elements and physical elements. According to certain embodiments of the present invention, the registration of the virtual model is performed with respect to an internal structure of a physical object even though the internal structure of the physical object is not visible. In contrast, other mixed simulators, such as an augmented anesthesia machine, utilize registration to external structures and make internal structures visible. That is, the other mixed simulator uses external registration where a virtual model is explicitly overlaid over its corresponding physical representation. Whereas, according to an embodiment of the present invention, the internal registration provides a virtual model that is underlaid to its physical representation.

According to certain embodiments, tools are tracked as a user interacts with the physical model. A representation of the tracked tool can be displayed interacting with the virtual model.

In addition, the tracking can be used to determine whether the instrument is impinging on another object and/or how hard the instrument is impinging in order to manipulate the virtual internal structures accordingly. For example, deformable internal structures can be made to appropriately reflect, in the display, the distortion caused by the "impinging" instrument. For example, the cross-section of a blood vessel may become less circular and flatter when pressure is being applied to it via the tool pressing on the skin surface above the blood vessel.

The tracked tools can have virtual representations within the virtual model so that a user can visualize the interaction of the tracked tool in the user's hand with the virtual model of the internal anatomy of the patient.

Feedback can be provided to the user through the virtual model and/or the physical model to indicate success and failure of an action performed. According to certain embodiments, haptic or other types of feedback can be included in the physical tools to further aid in the training. For example, visual feedback alone or in combination with haptic feedback can be utilized. One implementation of visual feedback includes one or more light emitting diodes (LEDs) indicating the occurrence of certain events. For a medical simulation example, blue and red LEDs can be used to indicate that a vein or artery, respectively, has been entered. In addition to the visual feedback from the colored LEDs, change in pressure in a needle being inserted into a body can be simulated to provide a realistic feel.

According to certain embodiments, tracking can be performed with respect to the display, a user, the physical model, and/or an associated instrument used in interacting with the physical model. The associated instrument can include external devices, tools, peripherals, parts, accessories, disposables, and components associated with the training. Examples of such instruments for simulations involving a patient mannequin include a scrub (skin prep) applicator, a laryngoscope, syringes, endotracheal tube, airway devices, ultrasound probe, cricothyrotomy kit implements, regional anesthesia nerve locator needle, and other healthcare devices.

In an embodiment, any suitable tracking system can be used to track the user, the display, the physical model, and/or the associated instrument. Examples include tracking fiducial markers, using stereo images to track retro-reflective IR markers, using the "Flock of Birds" magnetic tracking system, or using a markerless system.

The tracking system for the tool or tools and/or physical models can be implemented with commercial off the shelf (COTS) tracking systems such as the Natural Point OptiTrack infrared (IR) tracking system or the Ascension Technology Corporation Flock of Birds magnetic tracking system.

When using an IR tracking system, a set of infrared cameras that track IR-reflective fiducial markers affixed to the tool and/or physical model requires unobstructed line of sight between the cameras and the fiducial markers. Accordingly, at demos with a large crowd, enthusiastic attendees might get too close and obstruct the line of sight of the IR cameras leading to temporary system malfunction. However, certain advantages exist for using IR systems. For example, an IR tracked tool is completely untethered such that the tool does not have wires attached that might get in the way of the user or realism. An IR system is acceptable if the tool behaves like a 3D rigid body because once the location in 3D space of one part of the rigid body is known, the location of all parts of the rigid body in 3D space is easily known. For example, the tip of a needle in a syringe and needle assembly may no longer be visible because the needle tip has been inserted into a physical model of the chest. However, as long as the needle is not bent during insertion by the user by torquing or levering the syringe while advancing it, the position of the needle tip can be accurately calculated.

Estimation of needle tip position with an IR tracking system when the needle tip is bent or pre-bent can be determined. One approach uses information regarding whether the needle is inside the physical model and the exact point in 3D space where the needle entered the skin (the puncture point). Here, the skin puncture point is considered as a fixed fulcrum in 3D space. The part of the needle and syringe assembly outside the body acts as a lever of varying length (depending on how deeply the needle has been inserted) and the portion of the needle inside the body acts as the other part of the lever (on the other side of the fulcrum—from the skin puncture point). A spring constant can be assigned to the tissue to characterize the resistance of the tissue to lateral displacement of the needle tip and the bending characteristics of the needle can be modeled. Then, the needle tip location can be estimated based on tracking the deviation of the syringe axis from the original needle and syringe assembly trajectory upon skin puncture.

Another approach uses a set of precisely pre-bent needles that also have their virtual counterparts. Thus, when a user picks up one of the pre-bent needles, a micro switch below the needle storage location (or some other such device indicating the user selection) indicates to the simulator which specific pre-bent needle was picked. Then, the corresponding virtual pre-bent counterpart is loaded in the virtual 3D model and used to interact with the virtual internal structures. The number of pre-bent needles in the set can vary. For example, one set can have five pre-bent needles and other sets can have more or less numbers of pre-bent needles.

In a case where the tool is not a rigid body or the tool can be deformed during use or purposely deformed by the user (for example, by pre-bending the needle to facilitate insertion below and around the clavicle to reach the subclavian vein), a non-line-of-sight sensor, such as a Flock of Birds magnetic sensor embedded into the needle at the needle tip can be used to track the needle tip position. Because the Flock of Birds magnetic sensor is a wired sensor, the tool may be tethered by the sensor wire.

Although the above embodiments are described with respect to tracking a needle of a syringe, other instruments can be similarly tracked.

FIG. 1 shows a block diagram of an interactive mixed simulator system according to an embodiment of the invention. Referring to FIG. 1, an interactive mixed simulator system can include a physical model 101 of an object and a virtual model 102 of internal features of the object that are registered and underlaid with the physical model 101. A tracked tool 103 interacts with the physical model 101 in the physical component of the mixed simulation and the virtual model 102 in the virtual component of the mixed simulation. A tracking system 104 is used to monitor a user's actions (through, for example, the tracked tool 103) and tie the physical actions of the user to the virtual actions and consequences instantiated on a display 105. The tracking system can be a single system capable of tracking multiple objects or multiple systems for when multiple objects requiring different types of tracking systems need to be tracked. A simulation module (which may be stored on a computer readable media and contain computer readable instructions for the simulation or visualization) can be used to select the particular virtual model being used for the simulation. In addition, the simulation module, in conjunction with the tracking system 104, can provide a corresponding interaction with the virtual model (and consequence of that action) when the tracked instrument is being interacted with the physical model. The simulation module accesses the registered virtual model to tie the physical actions of the user to the virtual model 102.

The virtual model 102 can be stored in a memory and accessed when running the simulation. The memory can be any suitable computer readable media and includes volatile and non-volatile memory. A computer program product can be provided with a simulation program including the simulation module and can be associated with a particular physical model or system.

In one embodiment, a mixed reality system is provided that can be used for training of blind medical procedures, where the system includes virtual 3D anatomically correct models of internal features, such as organs and systems, that can be adjusted (including changing locations of structures) during repetitive training with a single physical model being interacted with.

According to a specific embodiment, when inserting a needle, catheter, or other instrument into the physical model of a body, a virtual representation of the internal features of the body, including bones, veins, arteries, and organs, where the needle is being inserted is instantiated on a display. The features of the physical model that are visible to the user are not shown in the display. However, the needle is represented and shown moving in response to actions taken by the user. When the needle nicks an artery or vein, the virtual representation can indicate a flashback of blood or warning to simulate the damage. The warning can be visual, audible, or a combination of visual and audio cues.

In a first mode, the user does not have access to the display of the virtual representations while performing a task. Instead, a person monitoring the user's progress can access the display while the user performs the task, or the display is available for after action review of the procedure.

During an after action review (AAR), the user's motions may be compared to those of an expert performing the same procedure (as in a third mode of operation). During the AAR, the interaction between an instrument and the internal structures can be reviewed.

When the instrument may be in front of a particular internal structure during an AAR (or even an actual or simulated procedure), it can be advantageous to provide a change in perspective for the reviewer and student or instructor or operator in order to determine aspects such as how close the instrument came in relation to the particular internal structure. For example, it is helpful to know whether a structure such as an artery was avoided, but it may be even more helpful to know how close the user (e.g., student) came to hitting the artery. In certain perspectives, it can be difficult to determine how close an object is to another object. Consider for example an unfamiliar tree (no familiarity about how tall or wide the tree is or the range of sizes it can have) in front of an unfamiliar building. When looking at the building from the perspective of standing on the ground in front of the tree (a side elevation view), it is difficult to determine how much in front of the building the tree is located. For example, the distance could be 10 feet away or 30 feet away. However, if the view is changed to be from the perspective of a helicopter over the tree (a plan view), it is easier to determine how far the tree is from the building. Applying this change of perspective to a medical procedure, to determine how a needle is located within a simulated or actual patient and steered by a trainee or operator when the needle is in front of a structure such as an artery, the viewing perspective can be changed to determine how close the needle is to the artery.

Traditionally, a perspective on a computer display of a 3D image is controlled by keys on a keyboard or a joystick. Manipulating the display perspective during AAR or an actual or simulated procedure with the keyboard is not easy and the same can be said about a joystick. The user has to perfoini coordinate translations via a keyboard or other device that itself may not be located or aligned with the display on which the 3D view is being displayed. Even when the desired perspective is finally obtained, a novice may not understand or know the perspective from which the 3D image is being displayed. Specifically, just because it is possible to arrive at a desired location within the displayed image does not result in the user knowing where and from what direction the displayed image is corresponding to within the actual object (e.g., a patient).

Accordingly, in certain embodiments, a 3D perspective controller (or camera controller) is provided to adjust the perspective of an image displayed during the AAR or procedure (simulated or actual). According to one embodiment, the 3D perspective controller is a tracked handheld device that can control the desired "camera" perspective of the 3D image viewed on the display. The 3D perspective controller can be a toy camera with a shutter button. As the 3D perspective controller is moved in the tracked space, the camera perspective of the 3D image on a display is changed in real time to reflect where the 3D perspective controller is located. The 3D perspective controller can include a pointer element providing the focal point for the desired camera perspective. Once a user has the pointer of the tracked handheld device in the direction of the desired perspective, a signal can be provided to the simulator system to use or freeze that particular perspective. The signal can be provided from a component of the 3D perspective controller. For example, in one embodiment, the 3D perspective controller includes a button or switch (on a toy camera, this could be the shutter button that has been instrumented) that can be pressed, released, or toggled to indicate that the desired perspective should be frozen or locked into place.

Figure 9:
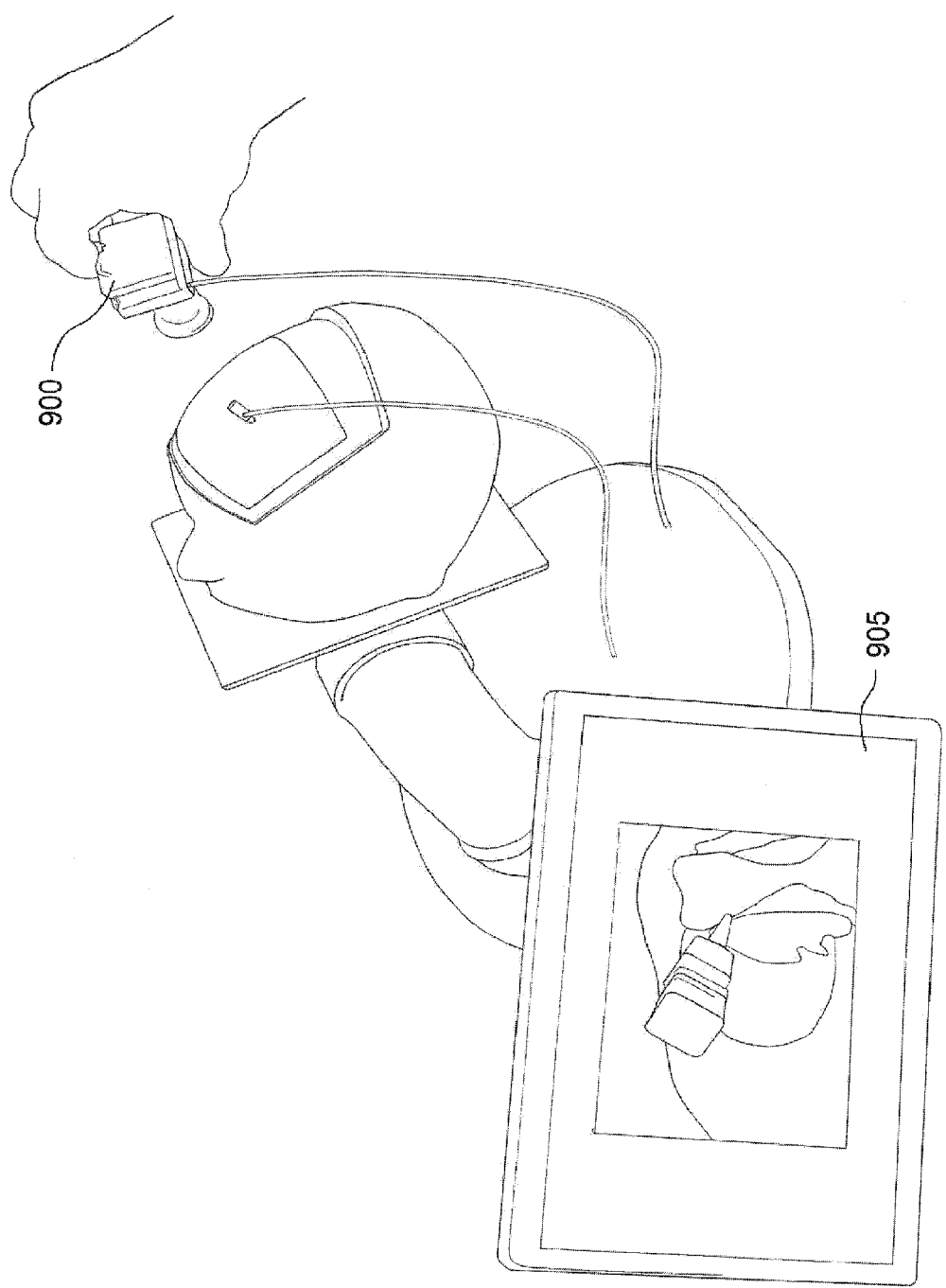
FIG. 9 shows a representation of an interactive mixed reality system with 3D perspective controller in accordance with an embodiment of the invention.

In a specific embodiment, such as shown in FIG. 9, the 3D perspective controller can be a handheld camera 900. In certain embodiments the handheld camera is tracked. The shutter button of the camera can tie the viewpoint in the virtual environment to the handheld camera. When the shutter button is depressed, the viewpoint available through the lens of the camera 900 becomes the viewpoint perspective of the virtual environment that is instantiated on the display 905. To lock a perspective in place, the shutter button can be released. By releasing the shutter button, the view point freezes and the camera can be set down without losing the viewpoint because the position of the 3D perspective controller now no longer controls the camera perspective in the virtual environment.

In another embodiment, the signal is provided by depressing a key on a keypad or switch (such as a USB switch) associated with the display or a computer on which the simulation or visualization is running.

The 3D perspective controller can also be used outside of the after action review process to adjust perspective of an image being displayed during the simulation or an actual procedure. In the case where the 3D perspective controller is used in actual medical procedures, the 3D perspective controller can be covered with a sterile disposable sheath to inhibit cross-contamination between patients when the 3D perspective controller is a re-usable component. In other embodiments, the 3D perspective controller can be a disposable component.

In a second mode, the display can be accessible to the user while performing the simulation or procedure. In the second mode, the display can be used as a 'magic lens' exposing the internal features where the user is working by using a display device positioned over the area being worked upon or by using a stationary screen that the user can refer to during the procedure.

For the magic lens mode, the display allows a user to interpose the appropriate representation (abstract or concrete) within the corresponding area of the virtual representation of the physical object. Through such a display, users can view a first-person perspective of an abstract or concrete representation, such as a photorealistic or 3D model of the internal features of the object. The representation appears on the display in the same position and orientation as the real physical object or simulation, as if the display was a transparent window (or a magnifying glass) and the user was looking through it.

Figure 6:
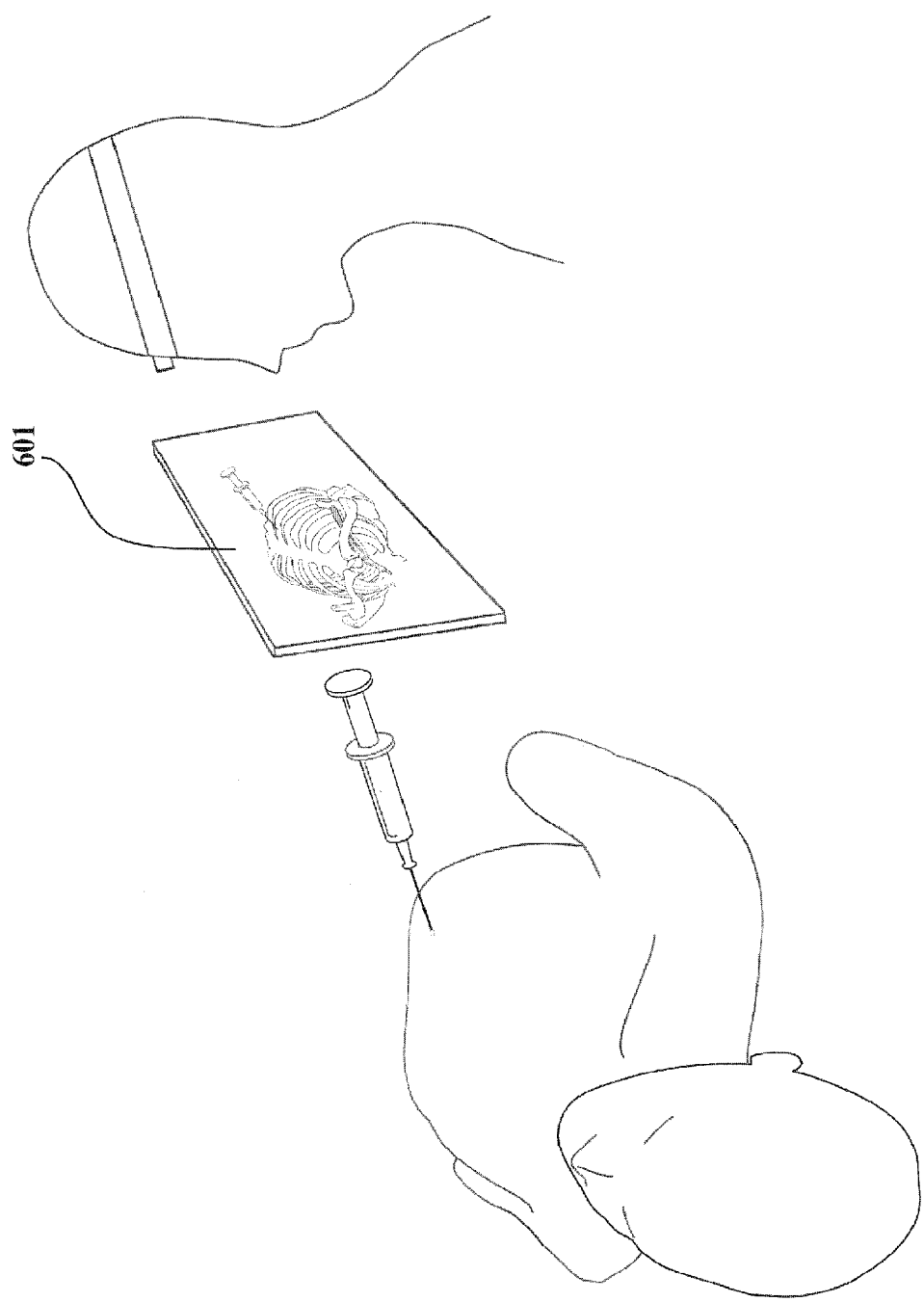
FIG. 6 shows a representation of a magic lens for use with a physical or mixed simulator in accordance with an embodiment of the invention.

For example, the virtual environment can be displayed on a tracked handheld display 601 as shown in FIG. 6. The display 601 can be a USB monitor, but embodiments are not limited thereto. In the second mode, users can view, from their perspective, internal structures that would otherwise be hidden (for example, skeletal and other anatomy in a medical simulation). The display can be tracked with one or more of the same methods described with respect to the instrument or any other COTS tracking system. For example, magnetic tracking (e.g., Ascension Flock of Birds) can be used to provide display position and orientation. The user may wear a tracked headband or eyeglasses so that the display can align its virtual representation to the user's perspective of a physical simulator or mixed simulator with very accurate registration.

In a third mode, an expert's motions can be displayed with the user's motions for comparison and/or enhancement of learning. In one embodiment, the expert's motions can be overlaid with the user's motions (or vice versa) and provided on a same display screen. In another embodiment, the motions can be provided separately on two portions of a same screen of a display device, on different display devices, or at different times on a same display device. The third mode can be conducted during performance of the simulation.

In a further embodiment, ultrasound modeling/representations and an ultrasound probe can be included to provide ultrasound training. The ultrasound images can be provided in addition to, or as an alternative to, the images of the internal features of the body displayed as part of the virtual representation. The ultrasound images can be provided on a same display screen or a different display screen as the virtual model/simulation.

For example, a fake or broken ultrasound probe can be used that is tracked in 3D space. As the fake ultrasound probe is moved, an ultrasound image of the internal structures is generated based on the position and angle of the fake ultrasound probe. By tracking the real or fake instrument, it can also be determined if the instrument is impinging on another object, such as a 3D torso, and how hard it is impinging. Internal structures that are deformable, such as blood vessels, can then be made to distort (e.g., become flatter in cross-section) based on the degree of impingement of the instrument to the external surface of the object.

In accordance with one embodiment, a mixed reality system for healthcare applications can be created by obtaining a virtual 3D model from medical imaging data of a real patient, creating a corresponding 3D physical model of part or all of the virtual model, and registering the virtual model to the 3D physical model. Fine registration can be established for millimeter (or less) accuracy between the physical model and the virtual model.

The 3D physical model can be formed using fast prototyping tools, such as 3D printers or milling machines. This 3D physical model may not be present within the physical object or simulation a user interacts with. However, in one embodiment, the 3D physical model is draped with fake skin and used as the physical object a user interacts with.

One implementation addresses the specific problem of simulating the insertion of a needle into a proper vessel for improved effectiveness in medical training of blind procedures.

Figure 2:
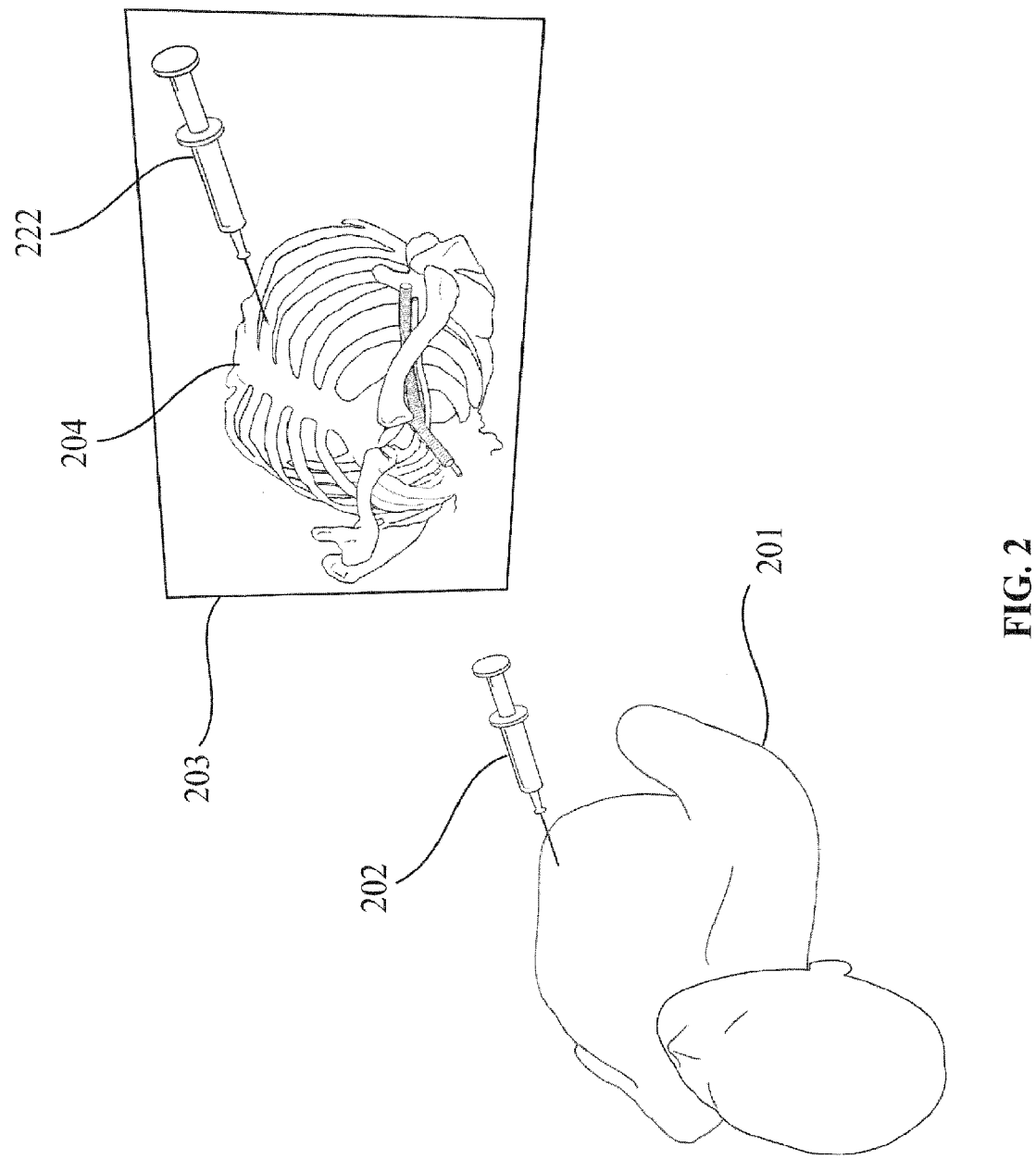
FIG. 2 shows a representation of an interactive mixed simulator system according to an embodiment of the invention.

FIG. 2 shows a representation of an interactive mixed simulator system that can be used for the simulation of inserting a needle into a proper vessel. Referring to FIG. 2, a physical model 201 is provided for interaction by a user wielding an instrument 202. A display 203 is provided to instantiate a virtual model 204 of select internal features of the physical object represented by the physical model 201. The instrument 202 is tracked so that a person viewing the display 203 or a software or scoring algorithm can determine whether the instrument 202 is navigated to the correct location within the physical model 201 in order to carry out the procedure being simulated. The instrument 202 may also be represented as a virtual instrument 222 on the display 203.

In a further implementation, the internal features of the physical model are not instantiated on a display. Instead, only the path of the instrument being used is instantiated on the display. Such a method, which can be used both for simulation and actual patient care, assumes that the user knows the internal features of the object and allows other cues to be taken into account. For example, insertion of a catheter into a patient's heart requires some understanding of the path of the catheter so that it can be determined whether the catheter entered one of the arteries and is heading toward a patient's feet. This simulation style can be useful in the magic lens mode.

In a specific embodiment of a CVL mixed simulation, an anatomically correct virtual model is provided of a patient's torso, including bones, vein/artery, and selected internal organs such as the lungs. The virtual model provides internal structures not visible to the user.

Internal organs are illustrated in the virtual model even though those organs do not necessarily have physical representations in the physical model.

The virtual model allows for modifications of the anatomy of the patient without requiring modifications to the physical model, resulting in easier and faster testing using a variety of patient characteristics. A library of patient anatomies can be utilized to allow for anatomical variability due to age, gender, and body type, etc. Embodiments can provide practice for anatomical variability.

In one embodiment, the anatomy is varied by providing slight variations in size based on a sample set of actual patients. For example, an average location/size of an element is determined and one to two standard deviations of the range of locations/sizes can be utilized. A same physical model can be used for repeated simulations by using a virtual model incorporating random selection of anatomy sizes/positions based on a population sample with standard deviations. Alternatively, or in addition, a set of discrete physical models spanning the range of sizes and locations can be used.

Also, identifiable features related to different attributes and conditions such as age, gender, stages of pregnancy, and ethnic group can be readily represented in the virtual representation and "underlaid" to the physical object.

For example, a virtual human model registered with a physical human patient simulator (or human mannequin) can represent different gender, different size, and different ethnic patients. The user sees the dynamic virtual patient while interacting with the human patient simulator (or human mannequin) as inputs to the simulation. The underlying model to the physical simulation is also modified by the choice of virtual human, e.g. gender or weight specific physiological changes.

The physical model for the healthcare simulation can be a patient mannequin. The patient mannequin can be a partial mannequin or a full body representing a patient, and can include physical body characteristics of a patient.

In addition, the physical model can be modified to change the physical features. For example, in one embodiment, padding can be added or removed to a patient mannequin. The padding can be useful in training medical staff for patients having a variety of body characteristics (including dealing with obese patients where it can be difficult to feel the topology used to determine where a needle is inserted). In certain embodiments, the patient mannequin can include removable pads representing subcutaneous fat.

The tool and/or instrument to interact with the physical model can be, for example, an actual medical instrument, a haptic device used in a physical simulation, a dummy device, or a combination thereof.

For the CVL mixed simulation, the tool can be a needle/syringe modified to provide realistic feedback to a user. During conducting of a central venous access a user is usually pulling back on the plunger of a syringe. If the needle tip is in tissue, the plunger cannot be pulled back. If the needle tip is in the artery or vein, the plunger can be pulled back and red (oxygenated) or blue (de-oxygenated) blood is aspirated respectively. According to a specific implementation of the subject system, with a system of electronically controlled valves, the user may be allowed to pull back on the syringe plunger whenever the needle tip is in a vessel or the lung. The red or blue blood flashback can be simulated with red or blue LEDs that light up or by allowing red or blue colored water to enter the syringe.

For example, if the needle tip is in the artery, the plunger pullback may be associated with a red LED lighting up, and in the case of a vein, a blue LED lighting up. In the case of the needle tip striking the lungs, plunger pullback may be associated with a noise simulating gas leaking out of the lungs. For example, an audible whoosh of leaking air can be played and the plunger is allowed to be pulled back and aspirate air.

Figure 3:
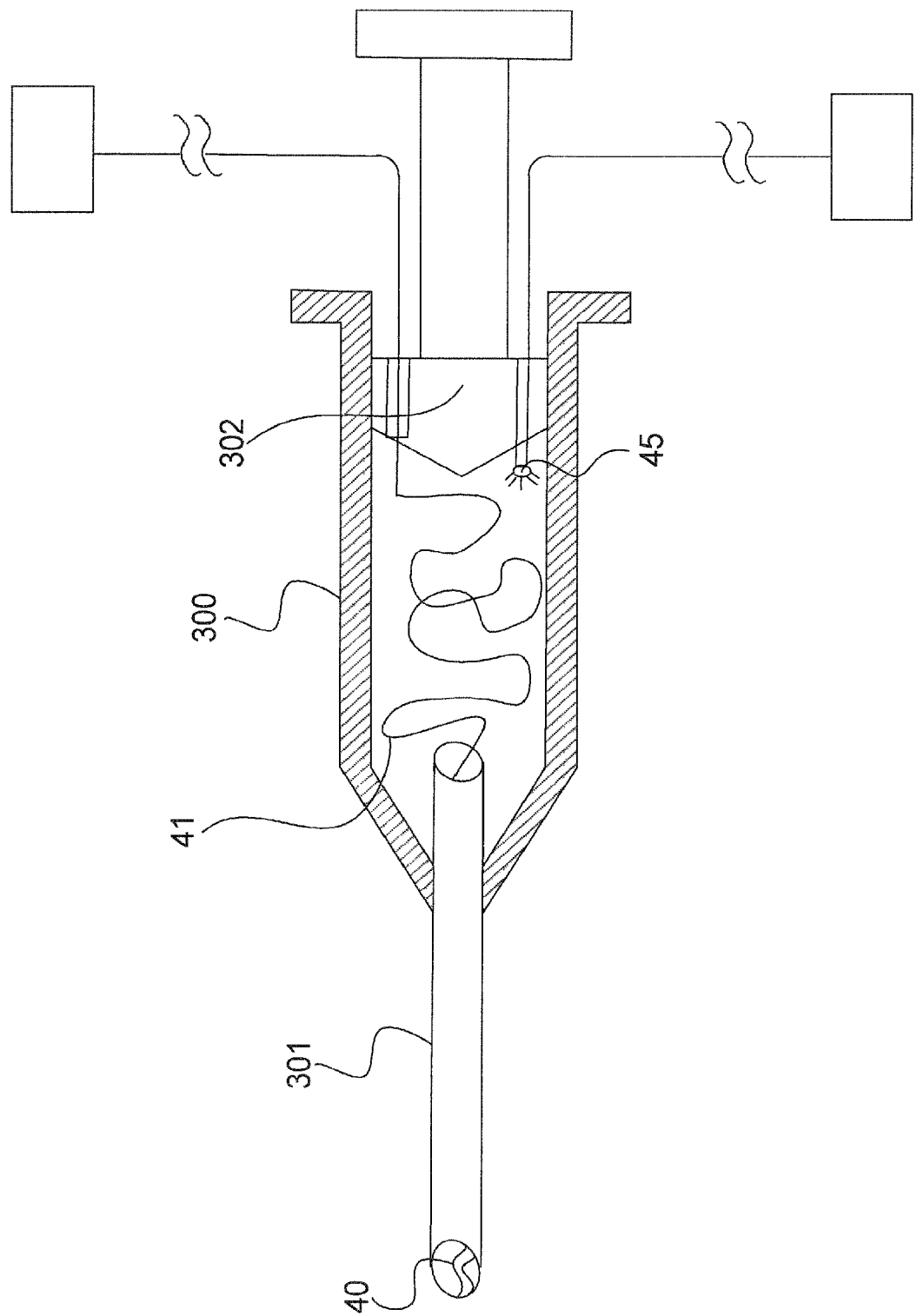
FIG. 3 shows a representation of a syringe instrument in accordance with one embodiment of the invention.

FIG. 3 shows a syringe instrument according to one embodiment of the invention. As shown in FIG. 3, the syringe 300 can include an electromagnetic tracking sensor 40 at the tip of the needle 301. The sensor's wire 41 extends through the needle 301 and exits through an aperture in the plunger 302 to connect to a tracking device receiving the output signal of the sensor 40. The wire 41 can coil up in the syringe 300 when the plunger 302 is down. One or more LEDs 45 can be included on the plunger 302. The one or more LEDs 45 can be, for example, a red and/or blue LED. The LEDs 45 can be connected to and controlled via interface circuitry that connects to a computer or microprocessor associated with the simulation.

Figure 5:
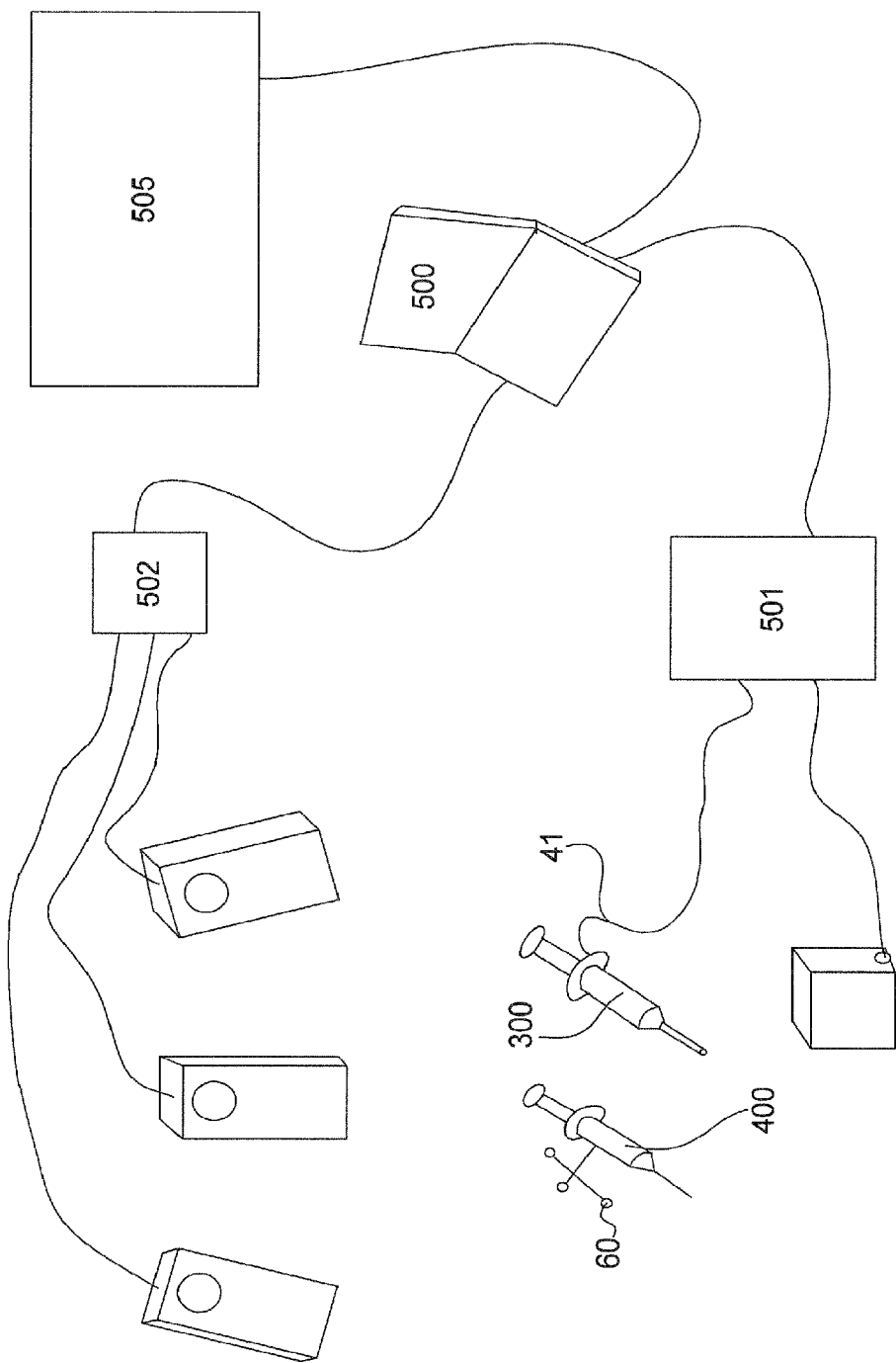
FIG. 5 shows a representation of an interactive mixed reality system including tracking system according to an embodiment of the invention.

As shown in FIG. 5, the sensor's wire 41 can be connected to an electromagnetic tracking system 501 that provides the tracking data of the syringe 300 to a computer 500 running the simulation. The electromagnetic tracking system 501 includes an electromagnetic field generator disposed at or near the physical model (shown wired to electromagnetic tracking system 501).

Figure 4:
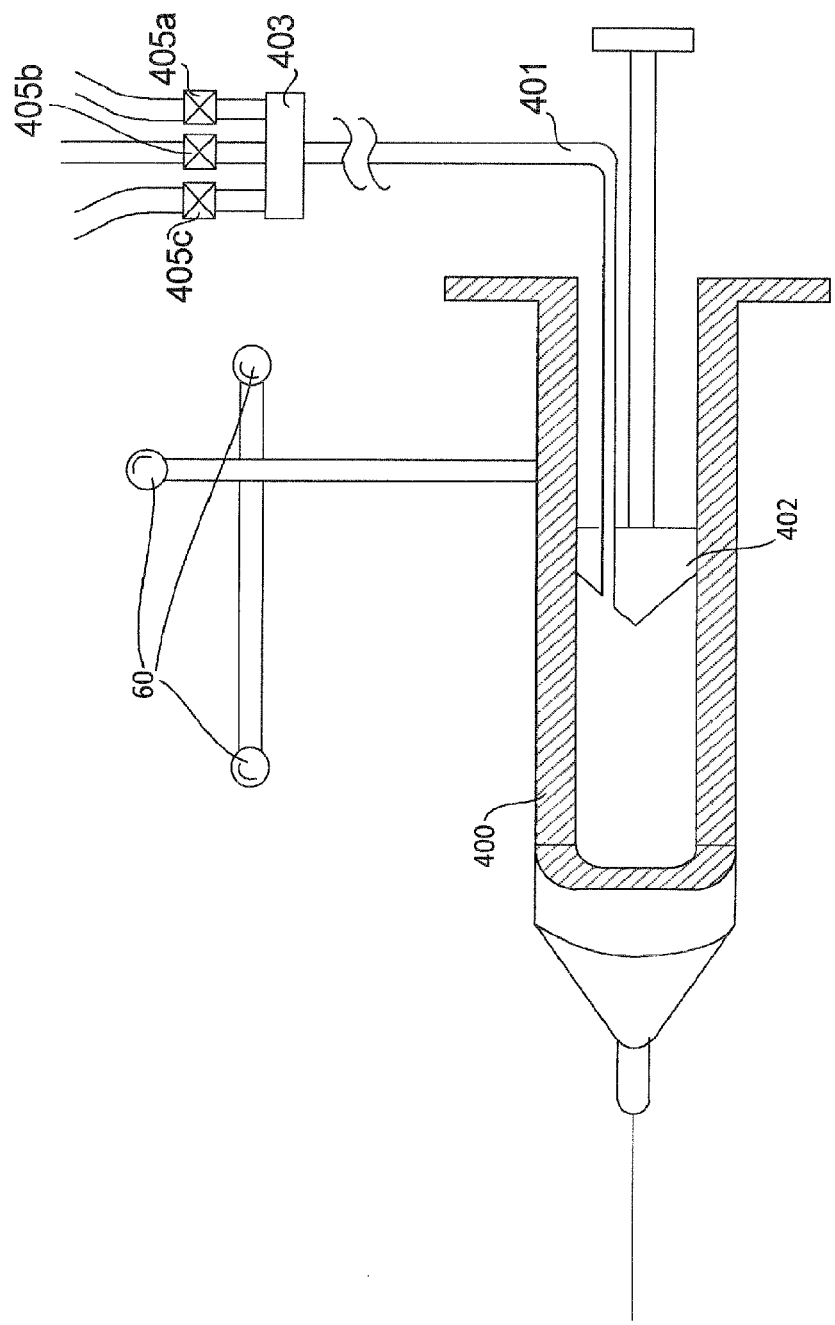
FIG. 4 shows a representation of syringe instrument in accordance with another embodiment of the invention.

According to another implementation, the syringe instrument used in the simulation can include a through hole drilled in the plunger face from the proximal side (side closer to the user). A small bore opaque tube can be connected to the hole in an airtight manner and routed out of the syringe at its proximal end. Controllable valves, such as solenoid valves, can be incorporated to provide the visual and/or haptic feedback within the syringe. In one embodiment, a normally-closed solenoid valve in pneumatic connection with the opaque tube inhibits the plunger from being drawn back when the solenoid valve is closed. When the solenoid valve is energized open (when the needle tip strikes the lung), room air is allowed to be drawn by the constant backward force exerted by the user on the plunger. A second solenoid valve in fluid connection with the opaque tube can also be configured as normally closed. When the needle tip strikes a vein, the valve can be energized so that blue colored liquid from a reservoir is aspirated by the constant backward force exerted by the user on the plunger. A third solenoid valve in fluid connection with the opaque tube can also be included and configured as normally closed. When the needle tip strikes an artery, the valve is energized so that red colored liquid from a reservoir is aspirated by the constant backward force exerted by the user on the plunger. FIG. 4 shows an embodiment of a syringe instrument for using the colored liquid. According to one embodiment, the syringe 400 includes optical tracking fiducial markers 60. The optical tracking fiducial markers 60 can be three reflective spheres attached to a side of the syringe 400. A tube 401 passing through the plunger 402 goes to a manifold 403 with electronically controlled valves 405(a,b,c), allowing the syringe 400 to be filled with fluid. In a specific embodiment, a first valve 405a can be used to allow air into the syringe 400; a second valve 405b can be used to allow red colored fluid into the syringe 400; and a third valve 405c can be used to allow bluish colored fluid into the syringe 400.

Although three solenoid valves are described, embodiments are not limited to the three. For example, some of the solenoid valves can be combined such that a single solenoid valve performs multiple functions.

Referring again to FIG. 5, the syringe 400 can be tracked using an optical tracking system 502 that includes cameras that track the fiducial markers 60. In one embodiment, three cameras can be used. The optical tracking system 502 provides the tracking data of the syringe 400 to the computer 500 running the simulation. The virtual component of the simulation is instantiated on a display 505. Although FIG. 5 illustrates both an optical tracking system 502 and an electromagnetic tracking system 501, a single tracking system may be used and selected based on the tool and/or simulation environment.

Other examples of areas where the mixed reality system of the invention can be applied to medical applications include, but are not limited to, cricothyrotomy and regional anesthesia. For cricothyrotomy, a trachea is located through a patient's neck in order to cut a hole in the trachea. For regional anesthesia, instead of trying to locate a vessel, the needle tip in combination with a stimulating electrical current is used to locate a nerve so that anesthetics can be injected near the nerve to numb the region that the nerve innervates, thus producing regional anesthesia.

According to another implementation of the invention, a ventriculostomy simulator can be provided. For example, a bedside ventriculostomy simulator that allows neurosurgery residents to practice inserting a tracked physical catheter into the brain to drain fluid from the brain ventricles can be implemented using a mixed simulation in accordance with embodiments of the invention. In one ventriculostomy simulator implementation, a trainee actually drills through the skull (a physical model of a skull) to blindly place a ventriculostomy catheter inside a ventricle to relieve pressure. In one embodiment, a full skull model is used. In another embodiment, replaceable inserts fitted into a model of the skull can be used for providing a region of the skull that the trainee actually drills into. The trainee can use the same/actual surgical implements and instruments as those used in real patients. For certain implementations using the replaceable inserts, the insert can be used twice before replacing—drilling once for right sided entry, and for the same or next trainee, drilling using left sided entry.

In one embodiment of the present invention, the subject simulator is applied to training for disarming an unexploded ordinance. As one example, unexploded ordinances may be disarmed by drilling a hole through the shell of the ordinance and using a small fiberoptic scope to determine the contents and initiate disarming. According to one implementation, a physical shell (modeled or actual) of an unexploded bomb is used as the physical object being manipulated. A tracked "fiberoptic scope" that is a real, fake, or broken instrument is used in interacting with the model of the unexploded bomb. In certain embodiments, the tracking can be similar to that described with respect to the syringe of the CVL simulation. Some or all of the internal elements of the bomb can be represented virtually. A display can be provided instantiating the virtual model of the internal features that would be available to see through the scope. As the fiberoptic scope is inserted into a hole in the bomb's shell, the tracking system enables a determination of the features that the scope would make available to the person performing the disarming of the ordinance. In a specific embodiment, as the scope is tracked, the "camera view" from the scope is generated of the virtual interior. Accordingly, bomb components can be viewed via a display screen when moving the tracked scope in an empty shell (or box). Other sensor, instruments, and remotely controlled machines may be used as the instrument interacting with the physical object. Advantageously, mistakes result in a virtual "explosion" instead of a real and potentially deadly explosion.

According to certain embodiments of the invention, registration between physical objects and virtual objects can be accomplished within millimeter (or less) accuracy. The fine registration can allow for immediate (or nearly immediate) feedback on actions taken with the physical objects based on the determined location of the virtual elements. Embodiments of the invention provide improved teaching and verification capabilities and can produce explicit feedback. For example, beyond simply answering whether the target was reached, the tracker can offer finer granularity by allowing trainees to know how undesirably close they came to hitting the lungs or the arteries. In one embodiment, this finer granularity is exploited by a scoring system.

In accordance with certain embodiments of the invention, only all or part of the surface of the physical model needs to be implemented for purposes of the simulation, while part or all of the internal structure, processes, and functions inside the model may be implemented virtually. For such embodiments, the time and effort to manufacture and precisely locate physical representations of the internal structure, processes, and functions in 3D-space is eliminated, as well as any expense and environmental impact associated with physical disposables.

While the subject mixed reality system has been described for use in training, certain features of the subject mixed reality system can be used during actual procedures using a real object or system instead of a physical representation of the real object or system. For example, a system having a tracked, handheld display similar to that described with respect to the "magic lens" embodiments can be used for a real or simulated object or system.

As one example of using such a system is the insertion of a central line catheter in a patient. The insertion of a central line catheter requires understanding of how to locate the position of a point on a catheter or device (such as the tip) in a real or simulated patient. A common problem when actually inserting a central line catheter in a patient is locating the needle tip or catheter tip—even when using ultrasound imaging. For example, an inserted catheter may fold and double back or even go down the wrong fork or branch. As previously described, the subject mixed reality system can be used to provide these cues. Then, in accordance with certain embodiments of the invention, components of the system can be used during the actual procedure.

Figure 7:
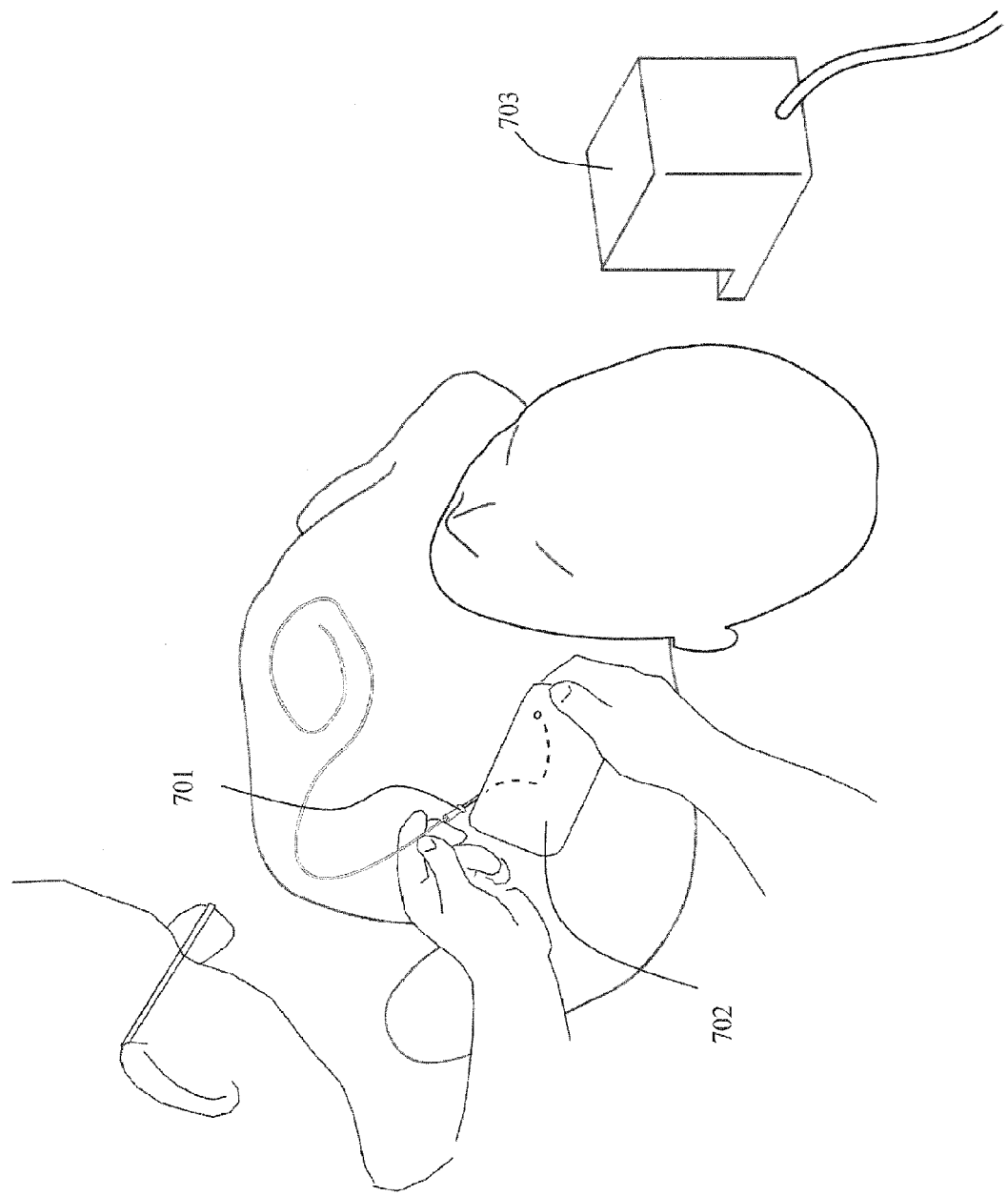
FIG. 7 shows an augmented reality application for actual patient care where the tip of a catheter or device introduced into a human body in a blind procedure is displayed. The dotted line represents the previous path of the tip and the circle the current position of the tip.

Referring to FIG. 7, the previous path and current position of a device's tip (or other location on the device 701) can be followed and represented using a tracked handheld display 702. The handheld display can be tracked using any suitable tracking means for marker, marker-less, line of sight, or non-line of sight tracking. The device 701 can be tracked using, for example, a non-line-of-sight electromagnetic tracking system using a transmitter 703. The device can be a catheter, and a user simply moves the display 702 between himself or herself and the catheter or device tip, which may be deep inside the patient (real or simulated). The previous path of the tip and the current tip location are represented on the display, aligned with the user's perspective. When used with a real patient, virtual anatomy may not be displayed or provided, and the transmitter 703 used for tracking the device can be placed anywhere nearby. In certain embodiments, the catheter or device tip, user's head, and the display are tracked. In other embodiments, only the catheter or device and the display are tracked. In another embodiment, when the display is not used as a magic lens, only the catheter or device is tracked and the display is stationary.

The implementation shown and described with respect to FIG. 7 presupposes that the user has a modicum of knowledge of anatomy and is able to interpret the position and direction of movement of the catheter tip illustrated on the display. For example, the user should be able to understand from the illustrations on the display that the catheter tip has doubled back and is moving opposite to the desired direction or that the tip is already in the wrong fork, branch or location. An advantageous feature of this implementation is that the patient does not need to be tracked and there is no radiation exposure to the patient or clinicians, which typically occurs when using X-ray or fluoroscopy during the procedure.

In an alternate embodiment, a camera is placed on the back of the display (the side of the display facing the patient). The video feed from that camera can be displayed on the display, and the path of the tracked portion of a device is overlaid over the video feed. As the display, and hence the camera at its back, is moved around, the image on the display focuses accordingly. For example, by moving the display closer to the patient, the image of the patient or part of the patient gets larger (as in a zoom function), and by moving the display farther away from the patient, the image of the patient or part of the patient gets smaller, but more area of the patient can be seen in the display. Because both the device and the display are tracked, the relative distance between them is known and the size of the overlay depicting the device locus and current position over the video feed is thus adjusted. The display can be moved in 3D space to provide any kind of desired perspective, including plan and side elevations. In addition, a 3D perspective controller can be used in certain implementations to adjust the perspective without moving the display.

Figure 8:
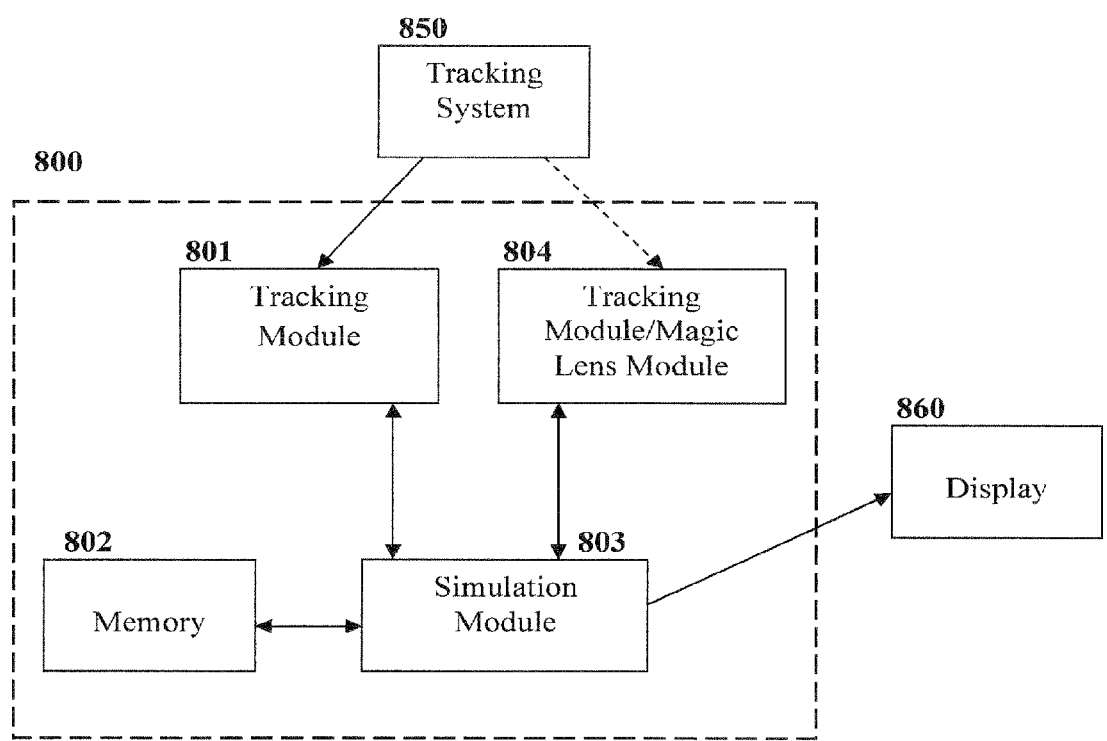
FIG. 8 shows a diagram of an interactive system in accordance with an embodiment of the invention.

FIG. 8 illustrates an interactive system in accordance with certain embodiments of the invention. Referring to FIG. 8, a system 800 for interacting with hidden internal features of an object includes a tracking module 801 for receiving input from a tracking system 850. The tracking module 801 can register an instrument (not shown) tracked by the tracking system 850 to positions within and neighboring the physical object. A virtual model of internal and external features of the physical object or other data for access by a simulation module 803 can be stored in the memory 802. The simulation module 803 receives input from the tracking module 801, accesses data stored in the memory 802, and outputs the interaction of the tracked instrument and the physical object as a virtual representation to a display 860. The simulation module 803 can provide a simulation or visualization of a procedure. A simulation refers to a visualization of a procedure with the further inclusion of additional responses and representations emulating cause and effect relationships between a user's actions and the object(s) being acted upon.

A second tracking module 804 can be included for receiving input from the tracking system 850 (which may be the same system as used to track the instrument or a different system) in order to determine position/orientation of the display 860. The second tracking module 804 can be used for providing input to the simulation module 803 (providing a simulation or visualization) for a magic lens implementation to be output to the display. The second tracking module 804 may also, or alternatively, be used for receiving 3D perspective controller data. According to certain embodiments, the tracking module, simulation module, and optional second tracking module can be implemented as computer implemented instructions for performing the particular functions of the modules.

In addition, the 3D perspective controller can include a module implemented as computer implemented instructions for corresponding the perspective information obtained by the controller's pointer (or camera lens for camera embodiments) to the perspective of a 3D model represented on a display. Such a 3D perspective controller can be used with existing or other systems where a 3D model of an object is to be navigated on a display.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. An interactive mixed reality system, comprising:
   a physical model of an object;
   a tracked instrument for interacting with and penetrating the physical model, wherein the physical model is penetrable through an external or internal surface at any location and at any orientation of the tracked instrument, wherein the tracked instrument is moveable freely within the physical model;

a tracking system for tracking the position and the orientation of the tracked instrument within and near the physical model;

a virtual model, stored in a memory, comprising one or more 3-D virtual representations of features of the object, the features comprising internal or hidden features of the object, wherein the one or more 3-D virtual representations are abstract or concrete representations;

a 3-D perspective controller device for selecting a perspective of the virtual model, wherein the perspective is selectable by a user independently of the position and orientation of the tracked instrument; and a simulation module that
  accesses the virtual model stored in the memory;
  receives input from the tracking system regarding the position and the orientation of the tracked instrument within or near the physical model;
  determines, based on the input from the tracking system, a corresponding interaction between the tracked instrument within or near the physical model and the one or more 3-D virtual representations of the virtual model;
  determines a consequence of the corresponding interaction; and
  renders, to a display, from the perspective of the virtual model selected on the 3-D perspective controller, a particular set of the one or more 3-D virtual representations, and the consequence of the corresponding interaction.

2. The interactive mixed reality system according to claim 1, wherein the object is a living entity.

3. The interactive mixed reality system according to claim 1, wherein the object is a non-living object.

4. The interactive mixed reality system according to claim 1, wherein the virtual model comprises anatomically correct models of internal organs, structures and systems.

5. The interactive mixed reality system according to claim 1, wherein in response to a repetitive training mode, the simulation module determines and renders a different set from the particular set of the one or more 3-D virtual representations, wherein the different set provides anatomical variability and levels of procedural difficulty.

6. The interactive mixed reality system according to claim 5, wherein the different set of the one or more 3-D virtual representations comprises changes to locations and sizes of structures in the particular set of the one or more 3-D virtual representations.

7. The interactive mixed reality system according to claim 1, wherein at least one of the features of the object is not physically present on the physical model, wherein the at least one of the features of the object that is not physically present on the physical model is provided by the virtual model.

8. The interactive mixed reality system according to claim 1, wherein the simulation module comprises computer implemented instructions of a simulation of a procedure.

9. The interactive mixed reality system according to claim 1, wherein the simulation module comprises computer implemented instructions of a visualization of a procedure.

10. The interactive mixed reality system according to claim 9, wherein the computer implemented instructions of the visualization of the procedure comprise instructions to provide a virtual representation of internal structures deforming as the tracked instrument approaches a deformable structure.

11. The interactive mixed reality system according to claim 1, wherein the rendering to the display by the simulation module further comprises rendering the tracked instrument as a virtual representation in the virtual model.

12. The interactive mixed reality system according to claim 11, wherein the virtual representation of the tracked instrument is shown interacting with features of the object in the virtual model that are not physically present in the physical model.

13. The interactive mixed reality system according to claim 1, wherein the tracked instrument is registered within the virtual model such that discrete adjustments, manipulations, and interventions of the tracked instrument are reflected in the virtual model.

14. The interactive mixed reality system according to claim 1, wherein the tracked instrument expresses tactile, haptic or visual cues for feedback to a user.

15. The interactive mixed reality system according to claim 14, wherein the tracked instrument is a syringe and the visual cues comprise:
  one or more light emitting diodes to indicate that a vein or artery in the virtual model has been entered by a needle connected to the syringe.

16. The interactive mixed reality system according to claim 1, wherein the tracked instrument comprises a deformable tool, wherein the tracking system comprises a magnetic sensor near a tip end of the deformable tool, the tool being insertable into the physical model.

17. The interactive mixed reality system according to claim 1, further comprising a second tracked instrument.

18. The interactive mixed reality system according to claim 17, wherein the second tracked instrument comprises an ultrasound probe.

19. The interactive mixed reality system according to claim 18, wherein based on a position and orientation of the ultrasound probe with respect to the physical and virtual models, the simulation module further generates a simulated ultrasound image.

20. The interactive mixed reality system of claim 19, wherein generating the ultrasound image comprises generating virtual representations of internal structures deforming according to how hard the tracked instrument is impinging the external surface of the physical model.

21. A system for interacting with features of an object, the system comprising:
  a physical model of an object, wherein the physical model is penetrable through an external or internal surface at any location and at any orientation;
  one or more tracked instrument for interacting with the physical model;
  a tracking module for tracking a position and an orientation of the one or more tracked instrument relative to the physical model;
  a virtual model, stored in a memory, comprising one or more 3-D virtual representations of features of the object, the features comprising internal or hidden features of the object, the one or more 3-D virtual representations comprising abstract or concrete representations;
  a 3-D perspective controller device for selecting a perspective of the virtual model, wherein the perspective is selectable by a user independently of the position and orientation of the one or more tracked instrument; and
  a simulation module that:
  accesses the virtual model stored in the memory;
  receives input from the tracking module regarding the position and orientation of the one or more tracked instrument relative to the physical model;
  determines, based on the input from the tracking system, a corresponding interaction between the one or more tracked instrument and the one or more 3-D virtual representations of the virtual model;

determines a consequence of the corresponding interaction; and renders, to a display, a virtual representation comprising a particular set of the one or more 3-D virtual representations, the corresponding interaction, and the consequence of the corresponding interaction; and wherein the rendering, to the display, is from the perspective of the virtual model selected on the 3-D perspective controller device.

22. The system according to claim 21, wherein the virtual representation further comprises an ultrasound or other medical image of features of the physical and virtual models on which the interaction of the tracked instrument and the physical and virtual models is indicated.

23. The system according to claim 21, wherein the 3-D perspective controller device further comprises a button to enable and disable a capture state, wherein the simulation module, upon receiving a signal disabling the capture state, instantiates the virtual representation on the display according to the perspective of the controller device and freezes the perspective of the virtual representation on the display, and wherein the simulation module, upon receiving a signal enabling the capture state, instantiates the virtual representation on the display according to a perspective which follows the current position and orientation of the perspective controller.

24. The system of claim 21, wherein the one or more tracked instrument penetrates through the external or internal surface of the physical model and is moveable freely within and near the physical model, and wherein the tracking module tracks the position and the orientation when the one or more tracked instrument is unsighted within the physical model.

25. The system according to claim 21, wherein the one or more tracked instrument comprises an ultrasound probe.

* * * * *

UNITED STATES PATENT AND TRADEMARK OFFICE
CERTIFICATE OF CORRECTION

PATENT NO.        : 9,251,721 B2
APPLICATION NO.   : 13/514474
DATED             : February 2, 2016
INVENTOR(S)       : Samsun Lampotang et al.

It is certified that error appears in the above-identified patent and that said Letters Patent is hereby corrected as shown below:

IN THE SPECIFICATION

Column 10,
Line 64, "perfoini coordinate" should read --perform coordinate--

Column 15,
Line 1, "drawn hack" should read --drawn back--

Signed and Sealed this
Thirty-first Day of May, 2016

Michelle K. Lee
*Director of the United States Patent and Trademark Office*